(12) United States Patent
Das et al.

(10) Patent No.: US 12,339,890 B2
(45) Date of Patent: Jun. 24, 2025

(54) PART COMPOSITION CLASSIFICATION FOR ARTICLES OF MANUFACTURE

(71) Applicant: Microsoft Technology Licensing, LLC, Redmond, WA (US)

(72) Inventors: Durgesh Nandini Das, Hyderabad (IN); Ranganathan Srikanth, Redmond, WA (US); Clarence Wong, Kolkata (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/486,934

(22) Filed: Oct. 13, 2023

(65) Prior Publication Data

US 2025/0124070 A1 Apr. 17, 2025

(51) Int. Cl.
G06F 16/00 (2019.01)
G06F 16/334 (2025.01)
G06F 16/35 (2019.01)
G06F 40/284 (2020.01)

(52) U.S. Cl.
CPC .......... *G06F 16/35* (2019.01); *G06F 16/3344* (2019.01); *G06F 40/284* (2020.01)

(58) Field of Classification Search
CPC .............................. G06F 16/35; G06F 16/3344
See application file for complete search history.

(56) References Cited

U.S. PATENT DOCUMENTS 10,853,858 B2* 12/2020 Yang ................. G06Q 30/0603
11,868,313 B1* 1/2024 Ryan ..................... G06V 10/764
11,995,842 B2* 5/2024 Ma .......................... G06T 7/174
2005/0071259 A1 3/2005 Arai et al.
2013/0073221 A1* 3/2013 Attinger ................. G16C 20/20
702/30
2022/0397886 A1* 12/2022 Hong ...................... G16C 20/10
2023/0027514 A1* 1/2023 Ma .......................... G06T 7/181
2024/0159128 A1* 5/2024 Gilliam .............. E21B 41/0064
(Continued)

OTHER PUBLICATIONS

"Additive Smoothing", Retrieved From: https://www.wikiwand.com/en/Additive_smoothing, Retrieved Date: May 4, 2023, 6 Pages.
(Continued)

*Primary Examiner* — Noosha Arjomandi
(74) *Attorney, Agent, or Firm* — Alleman Hall & Tuttle LLP

(57) ABSTRACT

Systems and methods for describing a composition of an article of manufacture are disclosed. In one aspect, a method includes receiving article composition data for an article of manufacture that identifies a set of parts of the article, a stated composition for each part of the set of parts, and a physical quantity of the stated composition. The method further includes classifying the stated composition of each part of the set of parts into a normalized composition that includes a set of normalized chemicals. The method further includes outputting an aggregated physical quantity of each normalized chemical for the set of parts of the article. The method can include classifying a normalized composition of each part into a material category within a hierarchical taxonomy based on the set of normalized chemicals of that normalized composition and outputting an aggregated physical quantity of each material category for the parts.

20 Claims, 9 Drawing Sheets

(56) References Cited

U.S. PATENT DOCUMENTS

2024/0192661 A1* 6/2024 Winkler ............. G05B 19/0426
2024/0361264 A1* 10/2024 San Roman Alerigi ....................
G01N 33/24

OTHER PUBLICATIONS

"Advancing the Worldwide Role of Chemistry", Retrieved From: https://iupac.org/, Retrieved Date: May 4, 2023, 3 Pages.

"Alcohol", Retrieved From: https://www.wikiwand.com/en/Alcohol, Retrieved Date: May 4, 2023, 4 Pages.

"Any Metal. Any Size. Cut & Ready Fast!", Retrieved From: https://www.metalsupermarkets.com/, Retrieved Date: May 4, 2023, 7 Pages.

"Benzene", Retrieved From: https://www.wikiwand.com/en/Benzene, Retrieved Date: May 4, 2023, 19 Pages.

"Biomer", Retrieved From: https://www.sciencedirect.com/topics/chemistry/biomer, Retrieved Date: May 4, 2023, 17 Pages.

Masson, J.F., "Brief Review of the Chemistry of Polyphosphoric Acid (PPA) and Bitumen", In Journal of Energy & Fuels, vol. 22, Issue 4, Jun. 2008, 16 Pages.

"Bisphenol A (BPA)", Retrieved From: https://www.niehs.nih.gov/health/topics/agents/sya-bpa/index.cfm, Retrieved Date: May 4, 2023, 3 Pages.

"Carbide", Retrieved From: https://www.sciencedirect.com/topics/materials-science/carbide, Retrieved Date: May 4, 2023, 11 Pages.

"Carboxylate", Retrieved From: https://www.wikiwand.com/en/Carboxylate, Retrieved Date: May 4, 2023, 6 Pages.

"About ClassyFire", Retrieved From: http://classyfire.wishartlab.com/about, Retrieved Date: May 4, 2023, 3 Pages.

"Complete Guide on Polybutylene Terephthalate (PBT)", Retrieved From: https://omnexus.specialchem.com/selection-guide/polybutylene-terephthalate-pbt-plastic, Retrieved Date: May 4, 2023, 3 Pages.

"Cotton is a Polymer Made up of", Retrieved From: https://www.vedantu.com/question-answer/cotton-is-a-polymer-made-up-of-a-wool-b-class-8-chemistry-cbse-5fbe69cf0736f778914f77bf, Retrieved Date: May 4, 2023, 6 Pages.

"Different Types of Dyes with Chemical Structure", Retrieved From: https://www.meghmaniglobal.com/different-types-of-dyes-with-chemical-structure/, Sep. 24, 2019, 9 Pages.

"Elastomer", Retrieved From: https://www.wikiwand.com/en/Elastomer, Retrieved Date: May 4, 2023, 6 Pages.

"Emulsifier", Retrieved From: https://www.britannica.com/science/emulsifier, Retrieved Date: May 4, 2023, 9 Pages.

"Ether", Retrieved From: https://www.wikiwand.com/en/Ether, Retrieved Date: May 4, 2023, 9 Pages.

"Fundamentals of Materials Science", Retrieved From: https://www.coursera.org/learn/fundamentals-of-materials-science, Retrieved Date: May 4, 2023, 8 Pages.

"Group 14 Hydride", Retrieved From: https://www.wikiwand.com/en/Group_14_hydride, Retrieved Date: May 4, 2023, 6 Pages.

"Hexpol: A Material Difference", Retrieved From: https://www.hexpol.com/, Retrieved Date: May 4, 2023, 7 Pages.

"Hydrocarbon", Retrieved From: https://www.wikiwand.com/en/Hydrocarbon, Retrieved Date: May 4, 2023, 11 Pages.

"Introduction to Chemistry: Reactions and Ratios", Retrieved From: https://www.coursera.org/learn/intro-chemistry, Retrieved Date: May 4, 2023, 7 Pages.

"IUPAC Nomenclature of Inorganic Chemistry", Retrieved From: https://www.wikiwand.com/en/IUPAC_nomenclature_of_inorganic_chemistry, Retrieved Date: May 4, 2023, 8 Pages.

"IUPAC Nomenclature of Organic Chemistry", Retrieved From: https://www.wikiwand.com/en/IUPAC_nomenclature_of_organic_chemistry#/Acyl_groups, Retrieved Date: May 4, 2023, 22 Pages.

"Liquid Crystal Polymer (LCP)", Retrieved From: https://www.rtpcompany.com/products/product-guide/liquid-crystal-polymer-lcp/#:~:text=Liquid%20crystal%20polymer%20(LCP)%20exhibits,%2C%20weathering%2C%20radiation%20and%20burning, Retrieved Date: May 4, 2023, 2 Pages.

"Materials and Processes", Retrieved From: https://www.nde-ed.org/Physics/Materials/index.xhtml, Retrieved Date: May 4, 2023, 8 Pages.

"Materials Data Sciences and Informatics", Retrieved From: https://www.coursera.org/learn/material-informatics, Retrieved Date: May 4, 2023, 7 Pages.

"Composite Types", Retrieved From: https://www.unsw.edu.au/science/our-schools/materials/engage-with-us/high-school-students-and-teachers/online-tutorials/composites/composite-types, Retrieved Date: May 4, 2023, 3 Pages.

"Microcrystalline Cellulose", Retrieved From: https://www.wikiwand.com/en/Microcrystalline_cellulose, Retrieved Date: May 4, 2023, 4 Pages.

"Petrochemical", Retrieved From: https://www.sciencedirect.com/topics/engineering/petrochemical, Retrieved Date: May 4, 2023, 7 Pages.

"Polyphenylene Ether (PPE)", Retrieved From: https://www.entecpolymers.com/products/resin-types/polyphenylene-ether-ppe, Retrieved Date: May 4, 2023, 3 Pages.

"Polyphenylene Sulfide", Retrieved From: https://www.wikiwand.com/en/Polyphenylene_sulfide, Retrieved Date: May 4, 2023, 5 Pages.

"PubChem Substructure Fingerprint", Retrieved From: https://web.cse.ohio-state.edu/~zhang.10631/bak/drugreposition/list_fingerprints.pdf, May 1, 2009, 21 Pages.

"Pug Rest", Retrieved From: https://pubchem.ncbi.nlm.nih.gov/docs/pug-rest, Retrieved Date: May 4, 2023, 30 Pages.

"Salt Acid-Base Reaction", Retrieved From: https://www.britannica.com/science/salt-acid-base-reactions, Sep. 25, 2023, 5 Pages.

"Scrim (material)", Retrieved From: https://www.wikiwand.com/en/Scrim_(material), Retrieved Date: May 4, 2023, 6 Pages.

"Silicide", Retrieved From: https://en.wikipedia.org/wiki/Silicide?oldformat=true, Retrieved Date: Sep. 23, 2023, 3 Pages.

"Siloxane", Retrieved From: https://www.sciencedirect.com/topics/chemistry/siloxane, Retrieved Date: May 4, 2023, 12 Pages.

"Siloxane Si—O—Si Chemical Bond", Retrieved From: https://www.wikiwand.com/en/Siloxane, Retrieved Date: May 4, 2023, 7 Pages.

"Solvent", Retrieved From: https://www.wikiwand.com/en/Solvent, Retrieved Date: May 4, 2023, 12 Pages.

"Spandex", Retrieved From: https://www.wikiwand.com/en/Spandex, Retrieved Date: May 4, 2023, 7 Pages.

"Technical Ceramic Materials", Retrieved From: https://www.coorstek.com/en/materials/#Technical_Ceramics, Retrieved Date: May 4, 2023, 20 Pages.

"Thermoplastic", Retrieved From: https://www.wikiwand.com/en/Thermoplastic, Retrieved Date: May 4, 2023, 10 Pages.

"Thermoplastic Vulcanisates (TPV or TPE-V)", Retrieved From: https://www.hexpol.com/tpe/resources/tpe-academy/what-is-tpe/what-is-tpv/, Retrieved Date: May 4, 2023, 3 Pages.

"Thermosetting Polymer", Retrieved From: https://www.wikiwand.com/en/Thermosetting_polymer#/overview, Retrieved Date: May 4, 2023, 7 Pages.

"Understanding Plastics and Polymers—The Different Types of Plastic", Retrieved From: https://www.azom.com/article.aspx?ArticleID=17477, Jan. 20, 2019, 16 Pages.

"Uses of Amines", Retrieved From: https://www.vedantu.com/chemistry/uses-of-amines, Retrieved Date: May 4, 2023, 11 Pages.

"Vectra® E130| BK210P Black", Retrieved From: https://omnexus.specialchem.com/product/t-celanese-vectra-e130i-bk210p-black, Retrieved Date: May 4, 2023, 3 Pages.

"What are the Rules of Naming a Compound in Chemistry?", Retrieved From: https://www.superprof.co.uk/resources/questions/chemistry/how-do-you-know-whether-to-use-ide-or-ate-when-naming-a-compound.html, Retrieved Date: May 4, 2023, 11 Pages.

"What is PTFE?", Retrieved From: https://www.fluorotec.com/materials/ptfe/what-is-ptfe/#:~:text=Polytetrafluoroethylene%20(PTFE)%20is%20a%20synthetic,for%20its%20non%2Dstick%20properties, Retrieved Date: May 4, 2023, 8 Pages.

"Advanced Ceramic Materials—Properties and Processes" Retrieved From: https://web.archive.org/web/20220415085937/https://www.azom.com/article.aspx?ArticleID=10712, Mar. 7, 2014, 7 Pages.

(56) References Cited

OTHER PUBLICATIONS

Anand, Sandeep, "Types of Steel—Classification of Steel", Retrieved From: https://www.weldingandndt.com/types-of-steel-classification-of-steel/, Retrieved Date: May 4, 2023, 11 Pages.
Bell, Terence, "Steel Grades and Properties", Retrieved From: https://www.thoughtco.com/steel-grades-2340174, Jan. 27, 2019, 5 Pages.
Cardarelli, Francois, "Miscellaneous Electrical Materials", In Materials Handbook: A Concise Desktop Reference, 2008, pp. 543-591.
Hardin, Tod, "Plastic: It's Not All the Same", Retrieved From: https://plasticoceans.org/7-types-of-plastic/, Feb. 23, 2021, 10 Pages.
Miller, et al., "Bulk Characterization and Scanning Electron Microscopy of Hydrogels of P(VA-co-NVP)", In Biomaterials, vol. 7, Issue 5, Sep. 7, 1986, pp. 329-339.
Schobert, Harold, "11—Composition, Classification, and Properties of Petroleum", Published by the Cambridge University Press, Feb. 5, 2013.
International Search Report Received in PCT Application No. PCT/US2024/048038, mailed on Dec. 12, 2024, 13 pages.

\* cited by examiner

PART COMPOSITION CLASSIFICATION FOR ARTICLES OF MANUFACTURE

BACKGROUND

Articles of manufacture may include an assembly of component parts formed from a variety of materials. A machine such as a server computing device, as an example, may include an assembly of hundreds, thousands, or more parts in which each part is formed from one or more materials and their constituent chemicals.

A bill of materials (BOM) may be used to describe the parts, part assemblies, and their respective compositions contained within an article. One example of a BOM is a Full Material Declaration or Full Material Disclosure (FMD) that describes the composition and physical quantity of the composition for each part of the article.

An FMD may be used to describe the composition of each part of the article on a per chemical basis and on a per material basis for materials formed from one or more chemicals. As an example, an FMD may be used to determine manufacturing, use, and disposal protocols for an article of manufacture, and whether the article is compliant with regulations or policies concerning the article's composition.

SUMMARY

A computing system and a method performed by the computing system are disclosed with respect to article composition data describing a composition of one or more parts of an article of manufacture. As an example, the method may include receiving article composition data that identifies a set of parts of an article, a stated composition of each part, and a physical quantity of the stated composition of each part.

The method may further include classifying the stated composition of each part of the article into a normalized composition of the part. The normalized composition may include a set of normalized materials and a set of normalized chemicals contained in the part. In at least some examples, the computing system implements a set of classification models to classify the stated composition of each part into the normalized composition. The method may further include outputting the normalized composition of each part and an aggregated physical quantity (e.g., a total mass) of each normalized material and each normalized chemical for the article.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
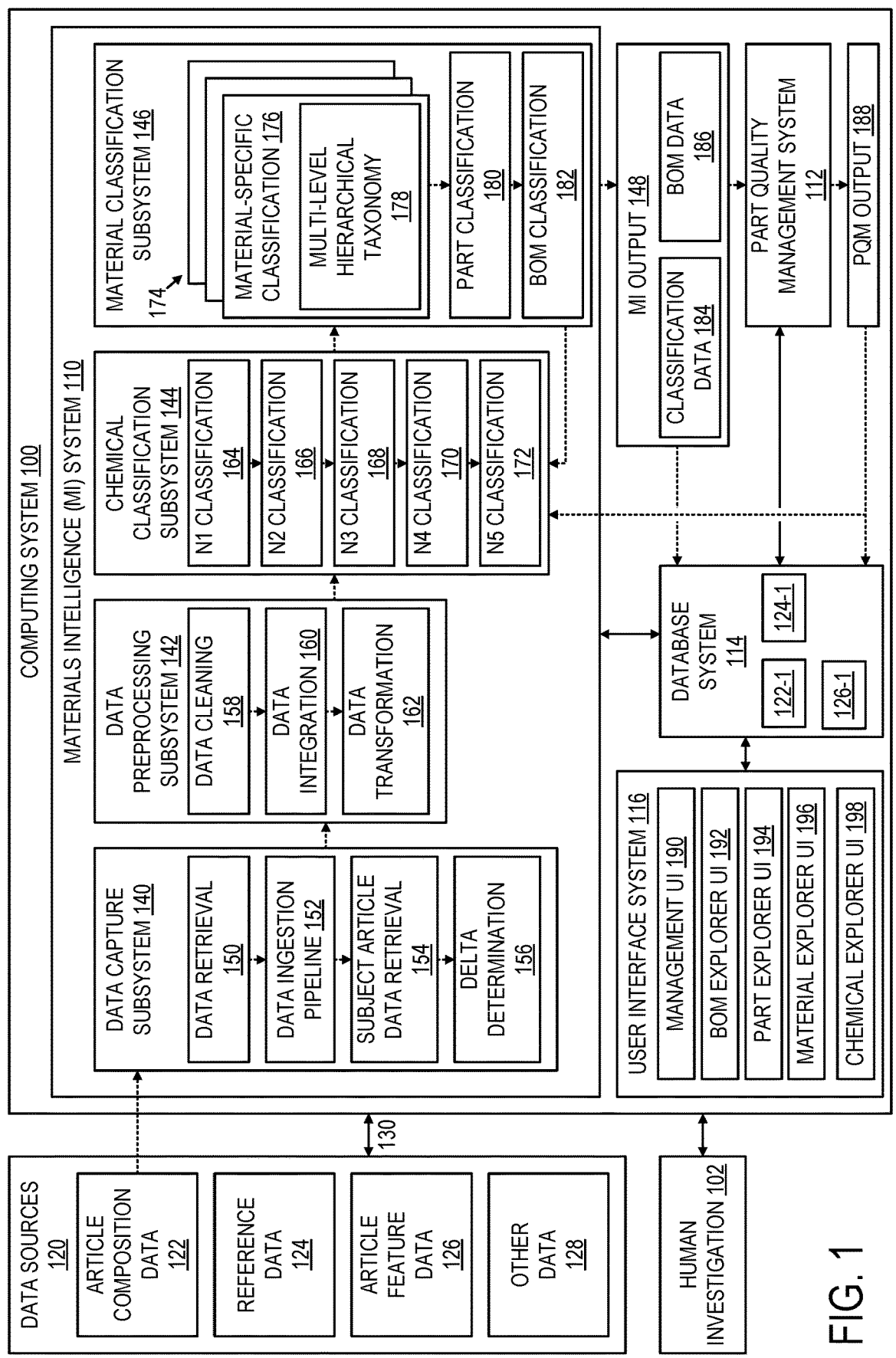
FIG. 1 is a schematic diagram depicting an example computing system, according to one aspect of the present disclosure.

As briefly introduced above, an FMD may be used to describe the composition and physical quantity of materials and constituent chemicals for each part of an article of manufacture. Various challenges may be associated with preparing, validating, or using FMDs based on source data. Some of these challenges may be due to inaccuracies, omissions, differences in naming conventions, or inadequate specification of materials and constituent chemicals by the source data of an FMD.

For example, source data identifying a stated composition of a part of an article of manufacture may inaccurately identify materials or their constituent chemicals, inaccurately identify physical quantities or physical units of materials or their constituent chemicals, utilize non-standard or different naming conventions for materials or their constituent chemicals, under specify materials or their constituent chemicals, omit materials or their constituent chemicals, or omit physical quantities or physical units of materials or their constituent chemicals. In each of these examples, preparing, validating, or using an FMD that is based on such source data may result in an inaccurate representation and misunderstanding of the actual composition of the article of manufacture.

As an illustrative example, source data for an article containing a chemical such as iron may misidentify the chemical as silicon. As another example, source data for an article containing stainless steel may inadequately specify that material as steel, for which there exists many forms having a variety of different chemical compositions. As yet another example, source data may misidentify or omit a mass of a chemical or material that is contained in an article.

Additionally, data sources for an FMD for the article may represent a part-material-chemical hierarchy for an article of manufacture in a variety of different ways. As an example, a data source may merge or otherwise mix material data with chemical data in a manner that does not accurately or fully describe the part-material-chemical hierarchy for the article.

In at least some examples, the above challenges may be addressed by the example computing system, method, and associated techniques disclosed herein. As an example, the disclosed computing system processes source data identifying a stated composition of each part of an article of manufacture, and generates an FMD or other BOM for the article that addresses inaccuracies, omissions, differences in naming conventions, and under specification of materials and constituent chemicals within the stated composition.

The computing system may implement a range of classification models to normalize and categorize materials and constituent chemicals identified by the source data as part of generating a BOM for the article. Normalization and categorization by the computing system may include generating a BOM for the article that has a predefined part-material-chemical hierarchy that may be used for downstream processes. As one example, the computing system may further implement a range of classification and regression models on the BOM generated for the article by the computing system to identify outliers in material and chemical-related data, thereby enabling programmatic substitution of corrective proxy data and inform human investigation of the article and the data source.

Normalization and categorization of materials and constituent chemicals contained in an article by the disclosed computing system and techniques offers the potential to improve recycling efficiency for the article and its various parts. For example, a more complete and accurate understanding of the composition of the article and mass of materials and chemicals contained therein allows greater control and informed selection of suitable part suppliers, recycling service providers, and efficient recycling processes. Additionally, a more complete and accurate understanding of the role of each part in the manufacture of the article in combination with knowledge of the composition and mass of materials and chemicals of each part may inform design processes aimed at improving sustainability and lifecycle efficiency for the article.

FIG. 1 is a schematic diagram depicting aspects of an example computing system 100 of one or more computing devices, according to one configuration. Referring to FIG. 1, computing system 100 includes a materials intelligence (MI) system 110, a part quality management (PQM) system 112, a database (DB) system 114, and a user interface (UI) system 116. Each of systems 110, 112, 114, and 116 may be implemented by one or more computing devices of computing system 100 executing a corresponding set of computer-readable instructions.

With continuing reference to FIG. 1, computing system 100 may receive and process various forms of data from a set of one or more data sources 120, including article composition data 122, article feature data 124, reference data 126, and other data 128. As an example, data sources 120 may take the form of one or more electronic data storage devices, such as a server system, computer mass storage device, etc. In at least some examples, data may be obtained from data sources 120 by computing system 100 over a communications network 130.

Data of obtained by computing system 100 from data sources 120 may be stored by computing system 100 in database system 114, which is accessible by MI system 110, PQM system 112, and user interface system 116. Examples of data that may be stored in database system 114 are depicted, including an instance of article composition data 122 represented at 122-1, an instance of article feature data 124 represented at 124-1, and an instance of reference data 126 represented at 126-1.

Continuing with FIG. 1, article composition data 122 identifies the material and chemical composition of one or more articles of manufacture. As an example, for each article of manufacture, article composition data 122 may identify a set of parts of the article, a stated composition of each part, a physical quantity (e.g., a mass) of the stated composition of each part, and other suitable information describing the article. As described above, source data for an article of manufacture, including article composition data 122 may include inaccuracies, omissions, differences in naming conventions, and under specified data describing the composition of an article.

As an illustrative example, an article of manufacture may include a machine formed by an assembly of multiple parts, such as a server computing device. The stated composition of a part of the article identified by article composition data 122 may include one or more materials. For example, a server computing device may include a device body that is formed from a material that includes stainless steel. Article composition data 122 may inaccurately identify the material (e.g., identify a polymer instead of stainless steel), omit the material, identify the material using a non-standard or different naming convention, under specify the material (e.g., identify metal or steel instead of stainless steel), or inaccurately identify a physical quantity (e.g., a mass) of the material contained in the device body.

Additionally or alternatively, the stated composition of a part of an article identified by article composition data 122 may include one or more constituent chemicals. Continuing with the example above, constituent chemicals identified for stainless steel contained in the device body of the server computing device may include iron, chromium, nickel, copper, manganese, silicon, phosphorous, carbon, and sulfur. Article composition data 122 may inaccurately identify a constituent chemical (e.g., identify silicone instead of silicon), omit a constituent chemical (e.g., omit iron), identify a constituent chemical using a different naming convention (e.g., identify steel instead of iron), under specify a constituent chemical, or inaccurately identify a physical quantity (e.g., a mass) of a constituent chemical.

MI system 110 includes a data capture subsystem 140, a data preprocessing subsystem 142, a chemical classification subsystem 144, and a materials classification subsystem 146. Subsystems 140, 142, 144, and 146 of MI system 110 may be implemented by computing system 100 to process article composition data 122 and generate a machine intelligence output 148 for one or more articles of manufacture based on the article composition data 122. As an example, article composition data 122 for a plurality of articles of manufacture may be received by data capture subsystem 140 of MI system 110 as part of data retrieval 150. In at least some examples, article composition data 122 may be received by data capture subsystem 140 from a plurality of data sources in electronic form as one or more separate files, documents, or data structures.

Data capture subsystem 140 may implement a data ingestion pipeline 152 to process and store data obtained from data sources 120 in database system 114 in a format suitable for further processing by computing system 100. As an example, data ingestion pipeline 152 may process article composition data 122 to obtain a connectivity map within database system 114 for each article of manufacture that associates parts data, materials data, and chemicals data with the article of manufacture. As another example, data ingestion pipeline 152 may process feature data 124 that describes various features of each article of manufacture to associate the feature data with each article of manufacture within database system 114. Within FIG. 1, article composition data 122 and feature data 124 processed by computing system 100 is depicted schematically within database system at 122-1 and 124-1, respectively. Each is illustrated as a stored instance of data in FIG. 1.

Data capture subsystem 140 performs data retrieval for a subject article of manufacture at 154, which may include retrieving article composition data 122, feature data 124, and processed forms thereof from database system 114 for the subject article. As an example, the subject article may be identified for retrieval, processing, and analysis by computing system 100 based on user input received via user interface system 116.

At 156, data capture subsystem 140 may determine a delta that identifies differences between data retrieved at 154 for the subject article and data that was previously processed for the article. As an example, differences identified in article composition data 122 for an article, such as a different composition for a part, may be further processed by subsystems 142, 144, and 146 without reprocessing other portions of the article composition data.

Following data capture performed by data capture subsystem 140, data preprocessing subsystem 142 may perform one or more of data cleaning 158, data integration 160, and data transformation 162 of article composition data 122-1 stored in database system 114 for the subject article. Data cleaning 158, for example, may include performing deduplication of duplicate data and removal of redundant or nonrelevant data from article composition data 122-1.

Data integration 160 may include merging article composition data from one or more data sources into a data format suitable for further processing by MI system 110. Data integration 160 may further include assigning material identifiers to materials based on material descriptions, and assigning chemical identifiers to chemicals based on chemical descriptions.

Data transformation 162 may include converting measurement units of physical quantities (e.g., pounds and kilograms for mass) to a common measurement unit (e.g., grams for mass), assigning mass fractions to materials contained within each part based on stated measurements of material mass, and assigning mass fractions to chemicals contained within each material based on stated measurements of chemical mass, as examples.

In at least some examples, a library of normalized chemicals and normalized materials may be defined based on reference data 126 and stored locally within database system 114 as processed reference data 126-1. This library may include a normalized chemical identifier and associated chemical data for each normalized chemical contained in the library, and a normalized material identifier and associated material data for each normalized material contained in the library. As an example, the library may include normalized chemical identifiers and associated chemical data for chemical elements of the periodic table. Additionally, the library of normalized chemicals may include normalized chemical identifiers and associated chemical data for a variety of chemical compounds, each formed by two or more chemical elements. As another example, the library may include normalized material identifiers and associated material data for a variety of materials. Processed reference data 126-1 may include normalized chemical identifiers for thousands of chemicals classified into a set of chemical categories, and normalized material identifiers for thousands of materials classified into a set of material categories.

In at least some examples, processed reference data 126-1, including the library of normalized chemicals and normalized materials may be established within database system 114 prior to processing article composition data 122. Portions of processed reference data 126-1, including the library of normalized chemicals and normalized materials may be established within database system 114 for chemicals or materials identified by article composition data 122. As an example, responsive to article composition data 122 identifying a previously unestablished chemical or material within processed reference data 126-1, MI system 110 may establish the material or chemical as a normalized material or normalized chemical within the library based on reference data 126 retrieved from data sources 120. For example, MI system 110 may assign normalized material or normalized chemical identifiers, and associated material or chemical data with the identifiers as part of establishing a material or chemical in the library.

Article composition data that is preprocessed by data preprocessing subsystem 142 may be stored within article composition data 122-1 of database system 114. Based on article composition data 122-1 obtained following preprocessing at 142, chemical classification subsystem 144 attempts to classify the stated composition of each part of a set of parts of the subject article into a normalized composition that includes a set of normalized chemicals for the part. As an example, chemical classification subsystem 144 may implement a hierarchical set of classification processes, referred to herein as N1 classification 164, N2 classification 166, N3 classification 168, N4 classification 170, and N5 classification 172. Each classification process may be implemented by computing system 100 using a respective classifier, as described in further detail herein. Furthermore, in at least some examples, each normalized chemical of the normalized composition may be classified by chemical classification subsystem 144 into a chemical category within a set of chemical categories defined by a chemical taxonomy.

The normalized composition of each part that includes a set of normalized chemicals for the part may be stored within article composition data 122-1 of database system 114. As an example, the set of normalized chemicals classified at 144 may each be identified within article composition data 122-1 by a respective normalized chemical identifier. Aspects of chemical classification subsystem 144 are described in further detail with reference to FIGS. 3A and 3B.

Continuing with FIG. 1, materials classification subsystem 146 classifies materials identified by preprocessed article composition data 122-1 for the article into material categories. Materials classification subsystem 146 may selectively implement one or more of a set of material-specific classification processes 174 for predefined material categories. Material-specific classification 176 is an example classification process of set 174. Examples of material-specific classification 176 include steel classification for materials that include steel alloys, an aluminum classification for materials that include aluminum or aluminum alloys, copper classification for materials that include copper or copper alloys, and material of interest classification for other materials.

Materials classification subsystem 146 may perform part classification 180 to classify each part into a respective part category within a predefined set of part categories. Example part categories include fasteners, electric motors, printed circuit board, chassis, power supply, fans, etc.

Materials classification subsystem 146 may perform BOM classification 182 to classify a BOM for the article of manufacture into a respective BOM category within a predefined set of BOM categories. Example BOM categories include raw materials, components, subassemblies, assemblies, and packaging. Some BOMs include software as well.

Machine intelligence output 148 may include classification data 184 identifying a result of classification of chemicals at subsystem 144, and materials, parts, and BOM classification at subsystem 146. Machine intelligence output 148 may further include BOM data 186 for each article of manufacture that is based on article composition data 122 processed for that article. BOM data 186 is further described below.

PQM system 112 receives MI output 148 generated by MI system 110. An output of PQM system 112 includes PQM output 188. The PQM output 188 may be stored in database system 114, or in another suitable storage system. PQM system 112 is further described in detail below.

Figure 2:
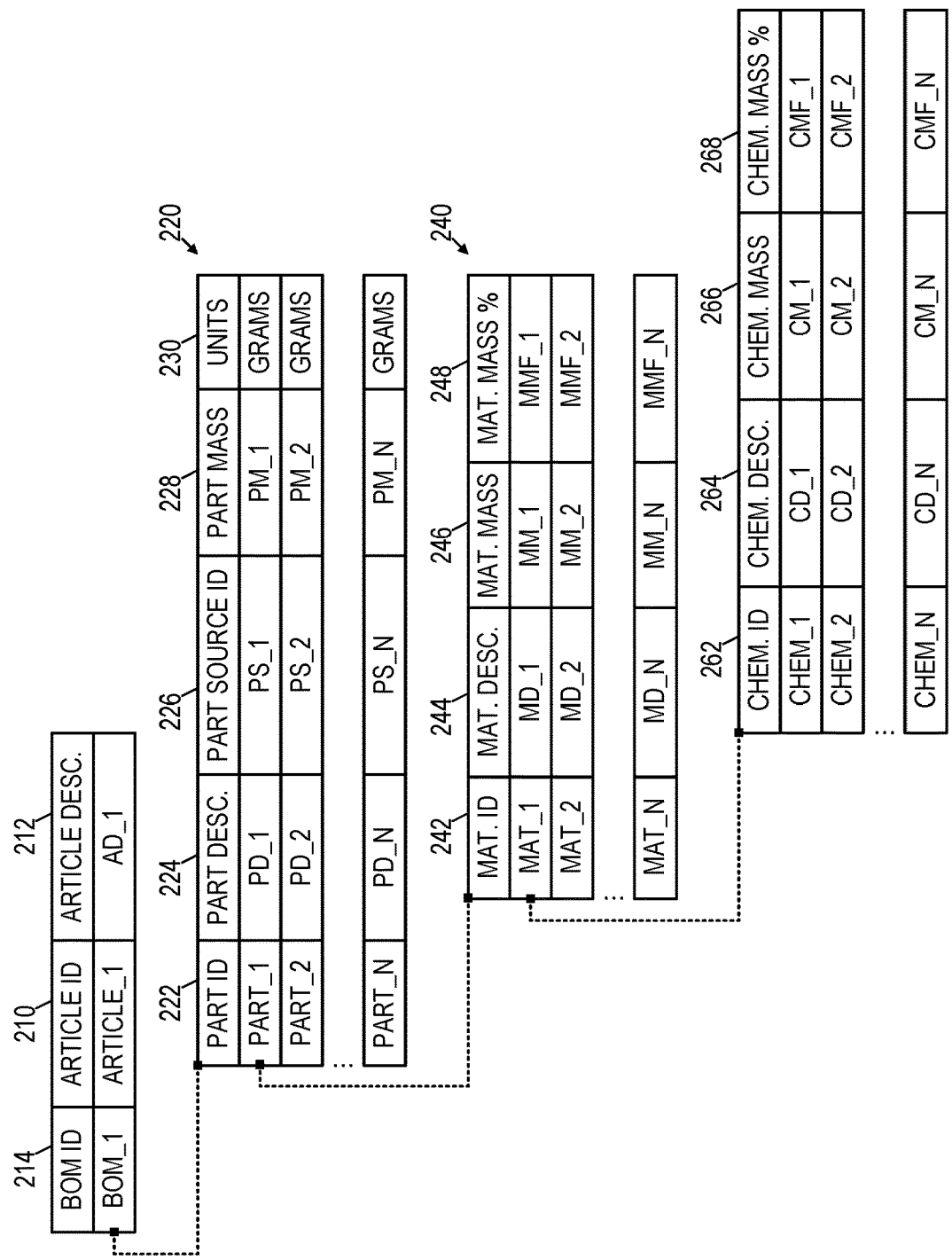
FIG. 2 schematically depicts an example of BOM data for an article of manufacture under consideration by the computing system of FIG. 1.

FIG. 2 schematically depicts an example of BOM data 186 for an article of manufacture. As an example, BOM data 186 may be generated by MI system 110 of FIG. 1 as part of MI output 148. In at least some examples, BOM data 186 may take the form of an FMD for the article. BOM data 186 may be based, at least in part, on article composition data 122 obtained from one or more data sources.

BOM data 186 includes an article identifier 210 identifying the article of manufacture. BOM data 186 further includes an article description 212 that is associated with article identifier 210 that provides additional information relating to the article. As an illustrative example, the article may take the form of a server computing device, article identifier 210 may take the form of an SKU of the server computing device, and article description 212 may take the form of a human-readable textual description of the article.

BOM data 186 further includes a BOM identifier 214 that is associated with article identifier 210. BOM identifier 214 may be assigned by MI system 110 of FIG. 1 in at least some examples, enabling BOMs of different articles to be distinguished from each other, and to enable multiple BOM versions for an article to be distinguished from each other.

For illustrative purposes, FIG. 2 depicts an example in which BOM data 186 includes ARTICLE_1 as article identifier 210, and AD_1 as article description 212, BOM_1 as BOM identifier 214.

BOM data 186 associates parts data 220 for the article with BOM identifier 214 and article identifier 210. For each part of a set of parts of the article, parts data 220 includes a part identifier 222, a part description 224, a part source identifier 226, a part mass 228, and measurement units 230. For a first part, for example, parts data 220 includes PART_1 as part identifier 222, PD_1 as part description 224, PS_1 as part source identifier 226, PM_1 as part mass 228, and GRAMS as measurement units 230. Parts data 220 further identifies additional parts of the article as depicted with reference to PART_2 through PART_N. Within FIG. 2, the term N is used to denote additional instances of data items in which N represents any positive integer beyond the depicted examples. However, N is not meant to be infinite. In a typical article of manufacture, for example, N may be on the order of tens, hundreds, or thousands of items.

Part identifier 222 may take the form of an SKU of the part, as an example. Part description 224 provides additional information relating to the part identified by the associated part identifier 222. As an example, part description 224 may take the form of a human-readable textual description of the part. Part source identifier 226 identifies a source of each part, such as a manufacturer or other provider. Part mass 228 identifies a mass of each part as measured in associated measurement units 230.

For each part identified by parts data 220, BOM data 186 further associates materials data with the part. As described with reference to the part identified as PART_1 for part identifier 222, for example, BOM data 186 includes materials data 240 associated with the part identifier. For each material of the part, materials data 240 includes a material identifier 242, a material description 244, a material mass 246 present within the part, and a material mass fraction 248 in relation to other materials associated with the part. For the part identified as Part_1, for example, materials data includes material identifiers MAT_1 through MAT_N corresponding to N materials present within the part.

Material identifier 242 may be assigned by MI system 110 of FIG. 1 in some examples, enabling materials to be distinguished from each other. Material description 244 provides additional information relating to the material identified by the associated material identifier 242. As an example, material description 244 may take the form of a human-readable textual description of the material (e.g., stainless steel). The measurement units for material mass 248 may be inherited from measurement units 230 of the part with which material data 240 is associated. In at least some examples, material mass fraction 248 may be assigned to each material of a part by MI system 110 based on material mass 246 identified for the material relative to the material mass of other materials of the part.

For each material identified by materials data 240, BOM data 186 further associates chemicals data with the material. As described with reference to the material identified as MAT_1, for example, BOM data 186 includes chemicals data 260 associated with the material. For each chemical identified as being present within the material, chemicals data 260 includes a chemical identifier 262, a chemical description 264, a chemical mass 266 present within the material for the associated part, and a chemical mass fraction 268 for the material. For the material identified as MAT_1, for example, chemicals data 260 includes chemical identifier CHEM_1 through CHEM_N corresponding to N chemicals present within the material.

Chemical identifier 262 may be assigned by MI system 110 of FIG. 1 in some examples, enabling chemicals to be distinguished from each other. Chemical description 264 provides additional information relating to the chemical identified by the associated chemical identifier 262. As an example, chemical description 264 may take the form of a human-readable textual description of the chemical (e.g., iron or silicon). Measurement units for chemical mass 266 may be inherited from measurement units 230 of the part with which chemical data 260 is associated. In at least some examples, chemical mass fraction 268 may be assigned to each chemical of a part by MI system 110 based on chemical mass 266 identified for the chemical relative to the chemical mass of other chemicals of the material.

Figure 3A:
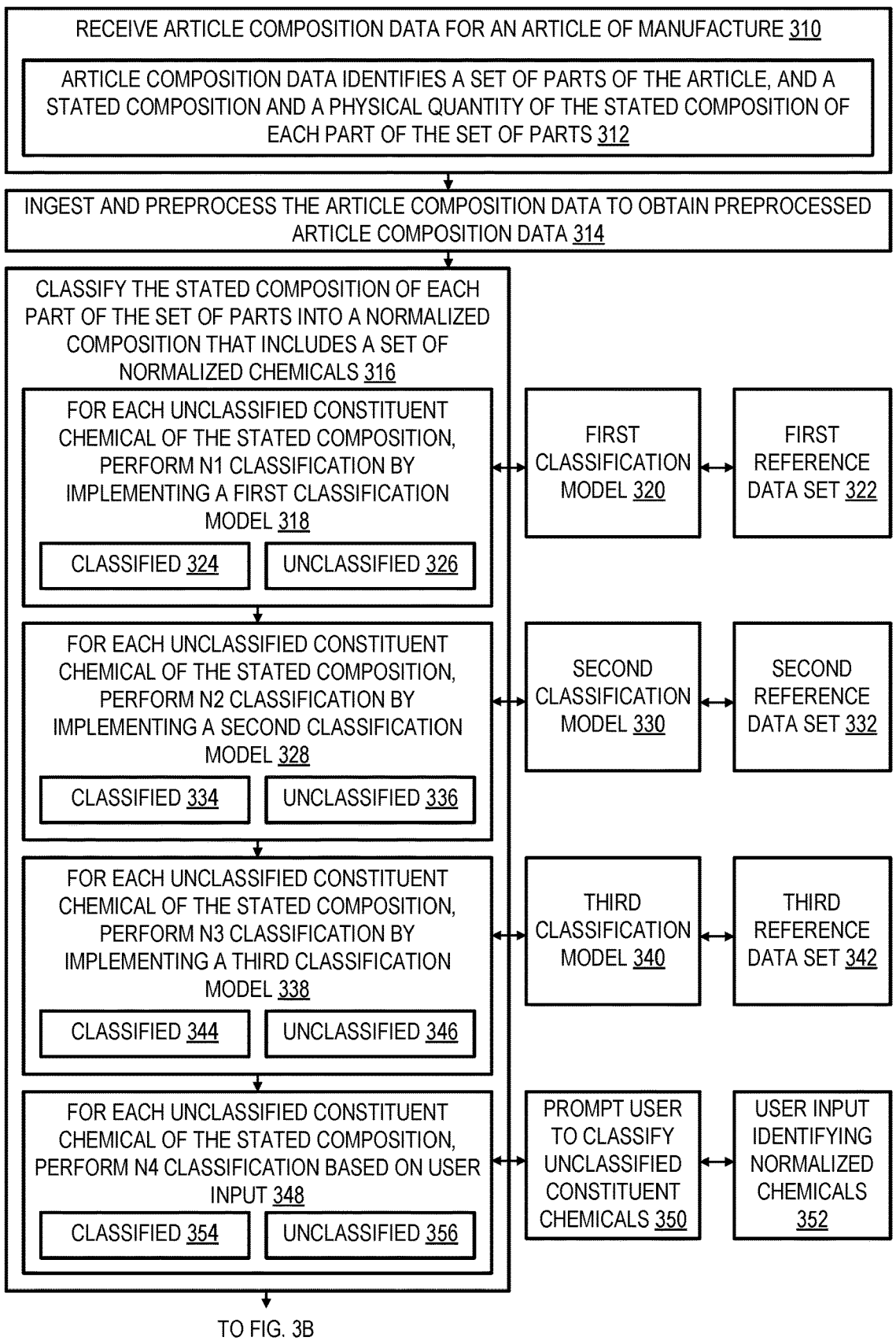
FIG. 3A is a flow diagram depicting aspects of an example method according to one aspect of the present disclosure.
Figure 3B:
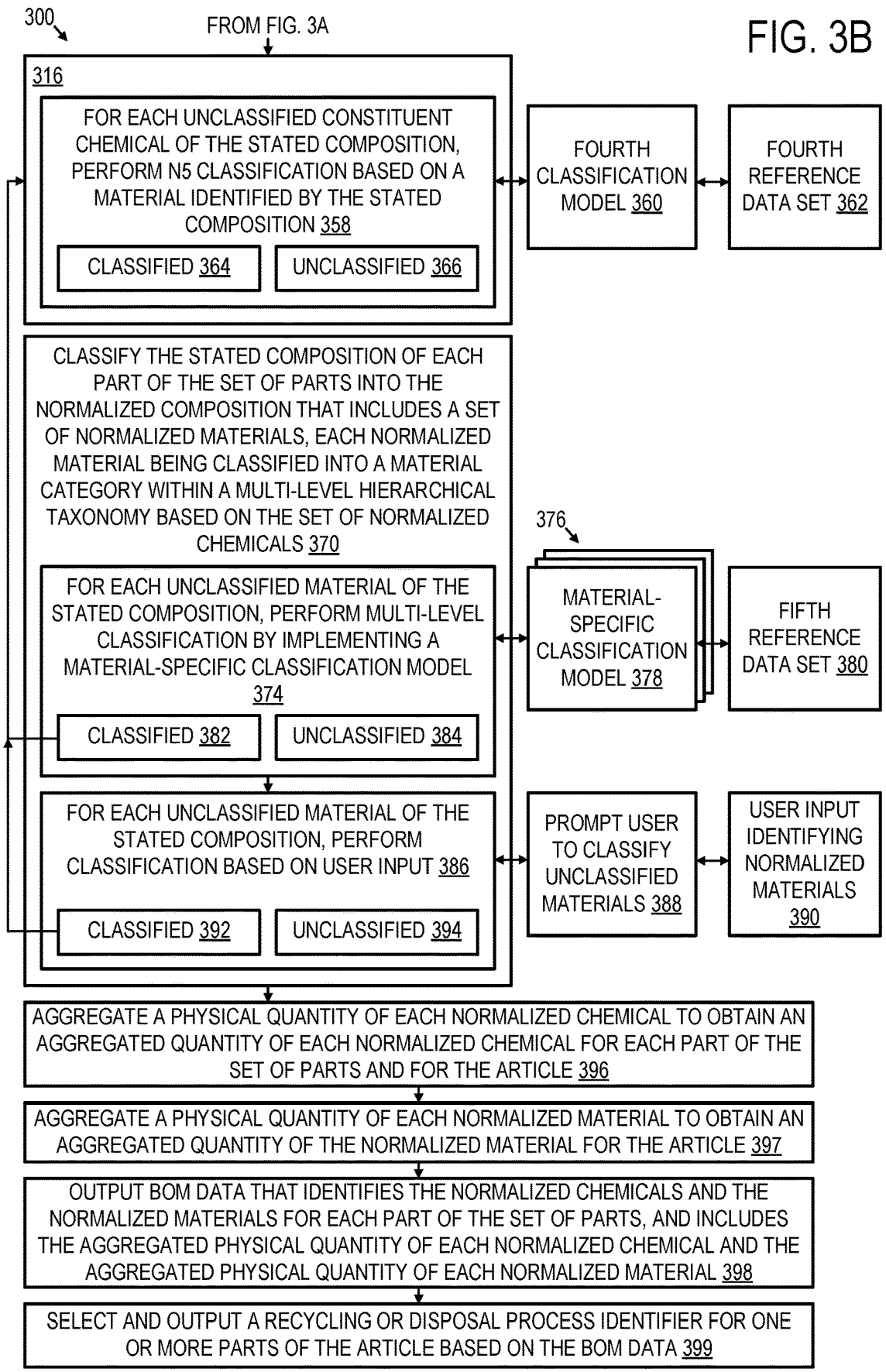
FIG. 3B is a continuation of the flow diagram of FIG. 3A, further illustrating the method.

FIGS. 3A and 3B are flow diagrams depicting an example method 300 that may be performed by a computing system, such as example computing system 100 of FIG. 1 or other suitable computing system. At 310, the method includes receiving article composition data for an article of manufacture. As an example, operation 310 may be performed by data capture subsystem 140 of FIG. 1. For example, the article composition data received at 310 includes article composition data 122 of FIG. 1.

As indicated at 312, the article composition data identifies a set of parts of the article, a stated composition of each part of the set of parts, and a physical quantity of the stated composition of each part of the set of parts. The stated composition of each part of the set of parts may identify one or more chemicals and/or one or more materials. For example, a stated composition of a part may identify steel as a material, and one or more chemicals such as iron, nickel, etc. as chemicals contained in the material and associated part. In some examples, the stated composition of a part identifies one or more chemicals, but does not identify any materials. In other examples, the stated composition of a part identifies one or more materials, but does not identify any chemicals. As previously described, the stated composition of parts within article composition data may include inaccuracies, omissions, different naming conventions, or under specified identification of chemicals, materials, and their physical quantities.

At 314, the method includes ingesting and preprocessing the article composition data to obtain preprocessed article composition data. As an example, operation 314 may be performed by data capture subsystem 140 and data preprocessing subsystem 142 of MI system 110 of FIG. 1. For example, with reference to the example of FIG. 1, operation 314 may include performing or otherwise implementing data retrieval at 150, data ingestion pipeline 152, target article data retrieval at 154, delta determination at 156, data cleaning at 158, data integration at 160, and data transformation at 162 to obtain the preprocessed article composition data. As part of operation 314, the article composition data and the preprocessed article composition data may be stored in database system 114 of FIG. 1.

At 316, the method includes classifying the stated composition of each part of the set of parts into a normalized composition that includes a set of normalized chemicals for the part. As an example, operation 314 may be performed by chemical classification subsystem 144 of MI system 110 of FIG. 1. For example, classification performed at operation 316 may include performing one or more of N1 classification 164, N2 classification 166, N3 classification 168, N4 classification 170, and N5 classification 172 of FIG. 1. The set of normalized chemicals used for classification at 316 may be defined by the previously described library of normalized chemicals and materials that may be established within processed reference data 126-1 of FIG. 1.

The method at 318 may include, for each unclassified constituent chemical of the stated composition of each part, performing N1 classification by implementing a first classification model 320. First classification model 320 may form part of chemical classification subsystem 144 of FIG. 1, and may be implemented by computing system 100 executing a corresponding set of instructions. For N1 classification, first classification model 320 queries a first reference data set 322 based on text of the preprocessed article composition data identifying one or more constituent chemicals and/or materials of the stated composition to obtain the set of normalized chemicals.

In at least some examples, first reference data set 322 may include the library of normalized chemicals and materials established within processed reference data 126-1. First classification model 320 may take the form of a search engine that searches for a stated constituent chemical of the stated composition of each part within the library of normalized chemicals and materials. In this example, chemical data associated with each normalized chemical identifier of the library may include one or more chemical name variants. First classification model 320 is configured to identify matches between constituent chemicals identified by the stated composition of each part and chemical name variants contained in the library. Constituent chemicals of the stated composition that are matched to chemical name variants are classified as normalized chemicals by assigning corresponding normalized chemical identifiers to the constituent chemicals. As an example, chemical classification subsystem 144 may replace a constituent chemical (e.g., magnesium or magnesium) identified for a part within the article composition data with the normalized chemical identifier (e.g., CHEM_1 of FIG. 2) and associated chemical description (e.g., Magnesium).

Constituent chemicals of the stated composition of each part classified as normalized chemicals at 318 are depicted schematically in FIG. 3A at 324. Constituent chemicals of the stated composition of each part that cannot be classified as normalized chemicals at 318 are depicted schematically in FIG. 3A at 326.

The method at 328 may include, for each unclassified constituent chemical of the stated composition of each part, performing N2 classification by implementing a second classification model 330. In at least some examples, N1 classification may be performed at 318 prior to performing N2 classification at 328 for unclassified constituent chemicals 326 of the stated composition of each part. Second classification model 330 may form part of chemical classification subsystem 144 of FIG. 1, and may be implemented by computing system 100 executing a corresponding set of instructions.

For N2 classification, second classification model 330 queries a second reference data set 332 using regular expression (regex) pattern matching of text components of the stated composition of each part identifying one or more constituent chemicals and/or materials to obtain the set of normalized constituent chemicals. Second classification model 330 may include or otherwise reference a regex engine.

A regex takes the form of a pattern that a regular expression engine attempts to match in input text. Within the context of N2 classification, the input text takes the form of text contained in second reference data set 332. A regex pattern includes one or more characters, operators, and/or constructs. Second classification model 330 is configured to extract text components and generate regex patterns from the text components of the stated composition of each part. As an illustrative example, a stated composition of a part may include 1,4-benzenedicarboxylic acid polymer with 2-methyl-1,8-octanediamine and 1,9-nonanediamine. In this example, the regex pattern may include % amine %.

Constituent chemicals of the stated composition that are identified within second reference data set 332 are classified as normalized chemicals by assigning corresponding normalized chemical identifiers to the constituent chemicals. As an example, chemical classification subsystem 144 may replace a constituent chemical identified for a part within the article composition data with the normalized chemical identifier and associated chemical description.

Constituent chemicals of the stated composition of each part classified as normalized chemicals at 328 are depicted schematically in FIG. 3A at 334. Constituent chemicals of the stated composition of each part that cannot be classified as normalized chemicals at 328 are depicted schematically in FIG. 3A at 336.

The method at 338 may include, for each unclassified constituent chemical of the stated composition of each part, performing N3 classification by implementing a third classification model 340. In at least some examples, N2 classification may be performed at 328 prior to performing N3 classification at 338 for unclassified constituent chemicals 336 of the stated composition of each part. Third classification model 340 may form part of chemical classification subsystem 144 of FIG. 1, and may be implemented by computing system 100 executing a corresponding set of instructions.

Third classification model 340 may include a natural language processing (NLP) model that can perform nearest neighbor analysis to determine a nearest neighbor to tokenized text within a third reference data set 342. For N3 classification, third classification model 340 applies natural language processing to a tokenized text component of the input data identifying a constituent chemical or a material of the stated composition to identify a nearest neighbor to the tokenized text component within third reference data set 342. In this example, normalized constituent chemicals are determined based on the nearest neighbor. In one specific example, FastText embeddings can be used, the spatial distance between a subject embedding and embeddings in the third reference data set can be computed, and properties of a closest match for a chemical or material that is within a threshold spatial distance of the embeddings for the constituent chemical or material can be applied by proxy to the constituent, to thereby produce a normalized chemical 338.

Constituent chemicals of the stated composition of each part classified as normalized chemicals at 338 are depicted schematically in FIG. 3A at 344. Constituent chemicals of the stated composition of each part that cannot be classified as normalized chemicals at 338 are depicted schematically in FIG. 3A at 346.

The method at 348 may include, for each unclassified constituent chemical of the stated composition of each part, performing N4 classification based on user input identifying the normalized chemical for the unclassified constituent chemical. In at least some examples, N3 classification may be performed at 338 prior to performing N4 classification at 348 for unclassified constituent chemicals 346 of the stated composition of each part. N4 classification may be performed by chemical classification subsystem 144 of FIG. 1, and may be implemented by computing system 100 executing a corresponding set of instructions.

As an example, chemical classification subsystem 144 prompts a user to provide a user input for unclassified constituent chemicals at 340, and receives user input identifying the normalized chemicals as indicated 352. Constituent chemicals of the stated composition of each part classified as normalized chemicals at 348 are depicted schematically in FIG. 3A at 354. Constituent chemicals of the stated composition of each part that cannot be classified as normalized chemicals at 338 are depicted schematically in FIG. 3A at 356.

Referring to FIG. 3B, the method at 358 may include, for each unclassified constituent chemical of the stated composition of each part, performing N5 classification based on a material identified by the stated composition. In at least some examples, N4 classification may be performed at 348 prior to performing N5 classification at 358 for unclassified constituent chemicals 356 of the stated composition of each part. Fourth classification model 360 may form part of chemical classification subsystem 144 of FIG. 1, and may be implemented by computing system 100 executing a corresponding set of instructions.

In at least some examples, the material identified by the stated composition may take the form of a normalized material identified by material classification performed at 370, as described in further detail below. N5 classification may be performed by a fourth classification model 360 referencing a material-specific rule set within fourth reference data set 362 for each material identified by the stated composition of each part to obtain a set of normalized chemicals and associated physical quantities of the set of normalized chemicals for the material. As an example, for a material identified as stainless steel, fourth classification model 360 references a rule set for stainless steel from fourth reference data set 362 that defines an associated set of normalized chemicals (e.g., iron, chromium, nickel, etc.) for stainless steel and associated physical quantities of the normalized chemicals. In at least some examples, the physical quantities associated with the set of normalized chemicals may take the form of a mass fraction that is based on a physical quantity identified for the normalized material.

Constituent chemicals of the stated composition of each part classified as normalized chemicals at 358 are depicted schematically in FIG. 3B at 364. Constituent chemicals of the stated composition of each part that cannot be classified as normalized chemicals at 358 are depicted schematically in FIG. 3B at 366.

At 370, the method may include classifying the stated composition of each part of the set of parts into the normalized composition that includes a set of normalized materials. Material classification performed at 370 may be performed by material classification subsystem 146 of FIG. 1, and may be implemented by computing system 100 executing a corresponding set of instructions. As part of material classification performed at 370, each normalized material may be classified into a material category within a multi-level hierarchical taxonomy based on the set of normalized chemicals identified for that material.

As an example, the multi-level hierarchical taxonomy may define a plurality of levels identified as L1, L2, L3, L4, etc. Level L1 may refer to a broadest material categorization, such as metal, polymer, ceramic, composite, etc. Level L2 may refer to a material categorization that is a species of the level L1 categorization, such as steel as a species of metal, thermoset as a species of polymer, advanced ceramic as a species of ceramic, polymer reinforced composite as a species of composite, etc. Level L3 may refer to a material categorization that is a species of the level L2 categorization, such as carbon steel as a species of steel, epoxy resin as a species of thermoset, zirconium-based ceramic as a species of advanced ceramic, etc. Level L4 may refer to a material categorization that is a species of the level L3 categorization, such as a specific composition of carbon steel (e.g., high carbon steel or low carbon steel) as a species of carbon steel. The material category within each normalized material is classified identifies a material description at two or more levels of the multi-level hierarchical taxonomy. For example, a stated composition of a part that identifies a material such as carbon steel may be classified as metal, steel, carbon steel within the L1, L2, L3 taxonomy framework.

As part of classification performed at 370, the method at 372 may include, for each unclassified material of the stated composition, performing multi-level classification within the multi-level hierarchical taxonomy by implementing a material-specific classification model. FIG. 3B schematically depicts a set of material-specific classification models 376 of which model 378 is an example. As an example, the set of material-specific classification models 376 may include a steel alloy classification model, an aluminum alloy classification model, a copper alloy classification model, and a polymer classification model. Each material-specific classification model is configured to classify a material of a stated composition within a material-specific portion of the multi-level hierarchical taxonomy.

Materials of the stated composition of each part classified as normalized materials at 374 are depicted schematically in FIG. 3B at 382. Materials of the stated composition of each part that cannot be classified as normalized materials at 374 are depicted schematically in FIG. 3B at 384.

The method at 386 may include, for each unclassified material of the stated composition of each part, performing classification based on user input. Classification at 386 may be performed by material classification subsystem 146 of FIG. 1, and may be implemented by computing system 100 executing a corresponding set of instructions.

As an example, material classification subsystem 146 prompts a user to provide a user input for unclassified materials at 388, and receives user input identifying the normalized materials at 390. Materials of the stated composition of each part classified as normalized materials at 388 are depicted schematically in FIG. 3B at 392. Materials of the stated composition of each part that cannot be classified as normalized materials at 386 are depicted schematically in FIG. 3B at 394. As previously described, materials of the stated composition of each part classified as a normalized material, as indicated at 382 and 392, may be used to perform N5 classification at 358.

At 396, the method includes aggregating a physical quantity of each normalized chemical identified by the article composition data to obtain an aggregated quantity of each normalized chemical for each part of the set of parts of the article. As an example, where a part includes two or more materials that each include the same normalized chemical, the physical quantities of that normalized chemical for the two or more materials may be summed to obtain a total quantity of the normalized chemical for the part. As part of operation 396, the method may further include aggregating the aggregated physical quantity of each normalized chemical for each part of the set of parts to obtain an aggregated physical quantity each normalized chemical for the article. As an example, where the article includes two or more parts that each include the same normalized chemical, the physical quantities of that normalized chemical for the two or more parts may be summed to obtain a total quantity of the normalized chemical for the article.

At 397, the method includes aggregating a physical quantity of each normalized material identified by the article composition data to obtain an aggregated quantity of each normalized material for the article. As an example, where the article includes two or more parts that each include the same normalized material, the physical quantities of that normalized material for the two or more parts may be summed to obtain a total quantity of the normalized material for the article. This aggregation may be performed at each layer of the taxonomy. In at least some examples, aggregation of physical quantities of normalized chemicals at 396 and normalized materials at 397 may be performed by materials classification subsystem 146 within part classification 180 of FIG. 1.

At 398, the method includes outputting BOM data that identifies the normalized chemicals and the normalized materials for each part of the set of parts of the article. The BOM data output at 398 further includes the aggregated physical quantity (e.g., mass) of each normalized chemical for each part and for the article, and the aggregated quantity (e.g., mass) of each normalized material for the article. BOM data output at 398 may include BOM data 186 of FIG. 1.

At 399, the method includes selecting and outputting a recycling or disposal process identifier for one or more parts of the article based on the BOM data. As an example, a recycling or disposal process identifier may be selected and output at operation 399 for one or more parts of the article based on the normalized composition of each part of the one or more parts, including the aggregated physical quantity (e.g., mass) of the normalized chemicals and normalized materials of each part of the one or more parts identified by the BOM data. The recycling or disposal process identifier may identify a recycling or disposal process among an available set of recycling and/or disposal processes.

In at least some examples, a rule set may be implemented by the computing system at operation 399 that associates each of a plurality of part composition profiles with a respective recycling or disposal process identifier. As an example, each part composition profile may define one or more mass thresholds and/or ranges for normalized materials and normalized chemicals that may be compared to the mass of the normalized materials and/or normalized chemicals of the normalized composition of each part identified by the BOM data.

Where the mass of the normalized materials and normalized chemicals of a part or set of parts identified by the BOM data satisfies a given part composition profile (e.g., based on thresholds and/or ranges), the computing system may select and output the recycling or disposal process identifier that is associated with that part composition profile. In at least some examples, the computing system may implement a matching algorithm that identifies the part composition profile that most closely matches the composition of the part or set of parts identified by the BOM data, including the relative mass of the normalized materials and normalized chemicals contained in the part. Recycling and disposal processes identified at operation 399 for one or more parts contained in the article may enable the article and its parts to be recycled or disposed of in an efficient manner.

Figure 4:
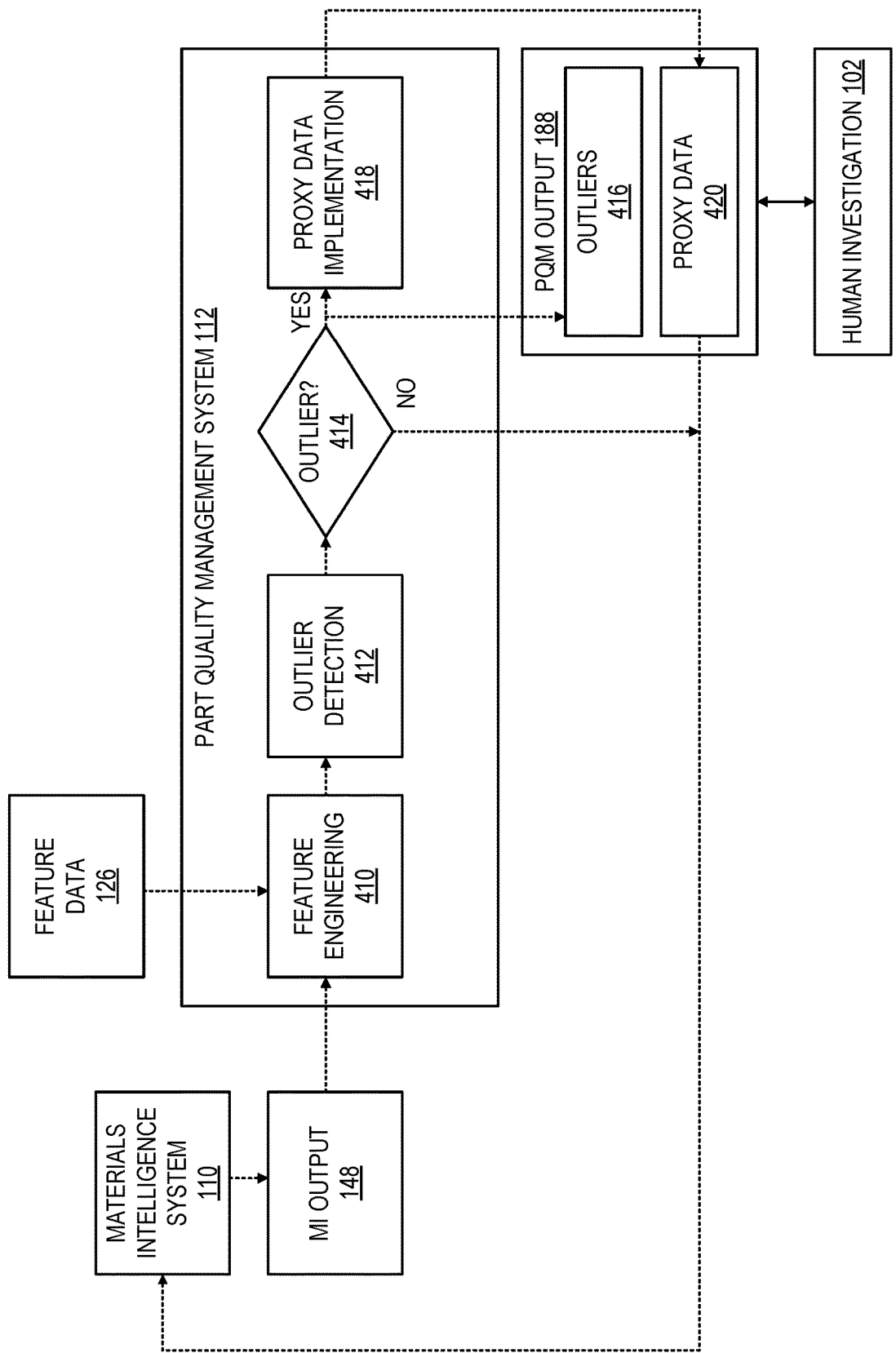
FIG. 4 is a schematic diagram depicting additional aspects of the computing system of FIG. 1, including a parts quality management system.

FIG. 4 is a schematic diagram depicting additional aspects of computing system 100 of FIG. 1, including PQM system 112. As previously described with reference to FIG. 1, PQM system 112 receives MI output 148 from MI system 110, and processes MI output 148 to generate PQM output 188. PQM output 188 may identify one or more classification outliers and/or one or more mass outliers present within MI output 148.

Classification outliers may include instances where a normalized composition of a part of a subject article identified by MI output 148 deviates statistically from a normalized composition of related parts of related articles. Classification outliers identified by PQM system 112 may arise from inaccuracies, omissions, differences in naming conventions, or under specification of stated compositions of parts within article composition data 122 for the subject article.

Mass outliers may include instances where a mass associated with a normalized composition of a part of the subject article identified by MI output 148 deviates statistically from the mass of the normalized composition of related parts of related articles. Mass outliers identified by PQM system 112 may arise from inaccuracies in the stated mass within article composition data 122 for the subject article.

For a subject article, PQM system 112 may perform feature engineering 410 of a set of related articles based on feature data 124 to identify primary features that have a statistically significant impact on classification of normalized compositions and associated mass for one or more parts. Feature engineering 410 is described in further detail with reference to FIG. 5.

Based on primary features identified by performing feature engineering 410, PQM system 112 may perform outlier detection 412 on MI output 148 for the subject article, including BOM data 186 to identify one or more outliers 416. PQM output 188 may include one or more outliers 416 identified by PQM system 112. Outlier detection 412 is described in further detail with reference to FIG. 6.

For outliers 416 identified by performing outlier detection 412, PQM system 112 may perform a proxy data implementation 418 in which one or more data items associated with the identified outliers are replaced or supplemented with proxy data 420 within MI output 148. PQM output 188 includes proxy data 420. Proxy data implementation 418 is described in further detail with reference to FIG. 7.

Human investigation 102 of outliers 416 identified by PQM system 112 may be performed to determine whether the outliers represent inaccuracies within article composition data 122 for the subject article upon which MI output 148 is based. Human investigation 102 may include reclassifying of stated compositions of parts of the subject article as normalized compositions or updating the stated mass of normalized compositions within MI output 148.

Proxy data 420 determined by PQM system 112 and replaced or supplemented within MI output 148, such as within BOM data 186, may be provided to MI system 110 as updated article composition data. MI system 110 may reprocess the updated article composition data as previously described with reference to FIGS. 3A and 3B to generate an updated MI output. PQM system 112 may receive and process the updated MI output as previously described with reference to MI output 148 to identify outliers present in the updated MI output. Accordingly, PQM 112 provides feedback to both users and to MI system 110 regarding the presence of outliers detected within BOM data for a subject article of manufacture.

Figure 5:
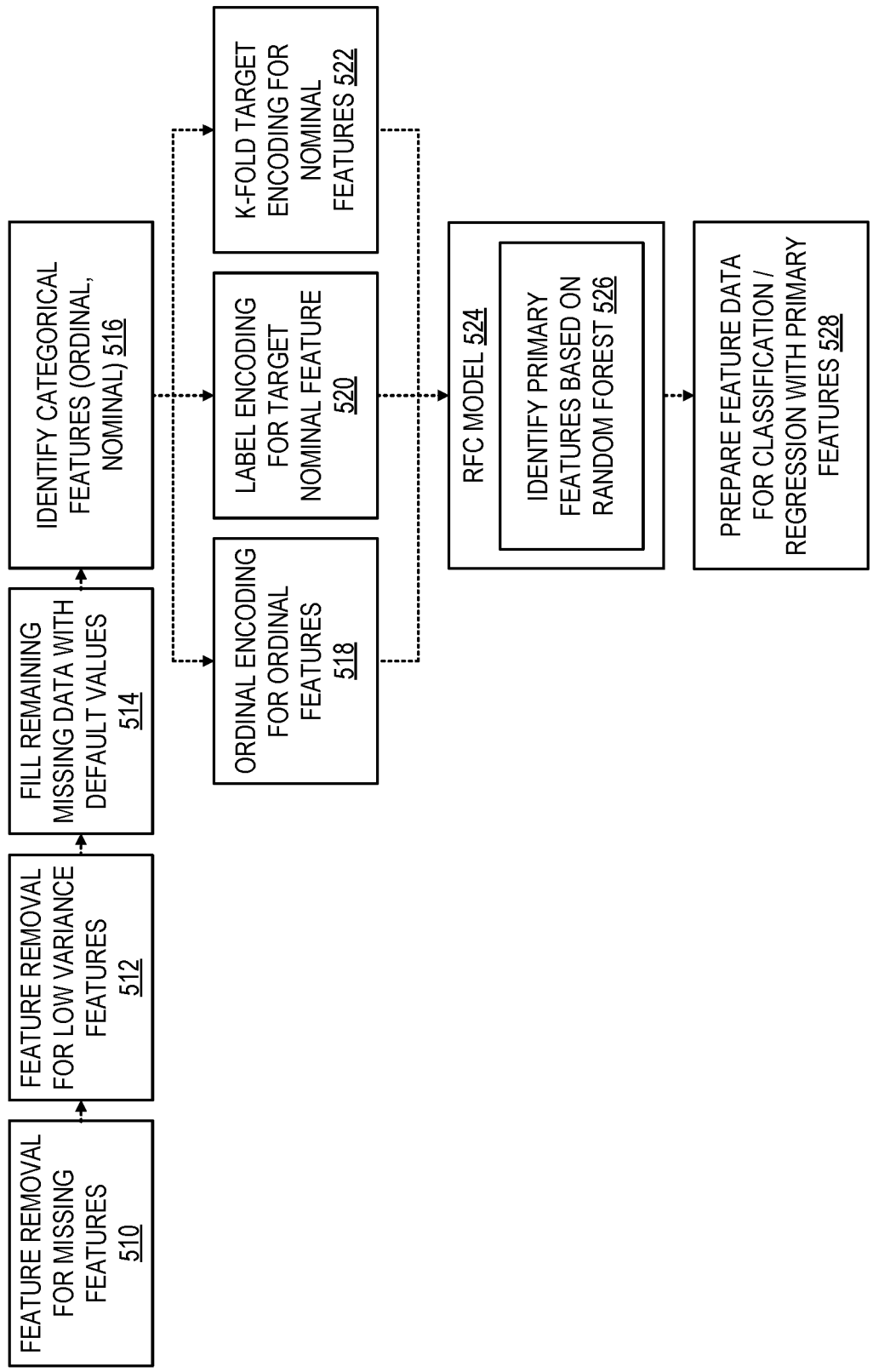
FIG. 5 schematically depicts additional aspects of feature engineering of the parts quality management system of FIG. 4.

FIG. 5 schematically depicts additional aspects of feature engineering 410 of FIG. 4. In at least some examples, feature data 124 identifies a set of features of each article of a plurality of articles, including the subject article corresponding to MI output 148 and related articles with respect to the subject article. Feature data 124 may identify a set of features of a part that is present in each article of the plurality of articles. As an example, the subject article may take the form of a server computing device having a solid state drive as a part of the subject article. Related articles described by feature data 124 may also take the form of server computing devices, each having a respective set of features of a solid state drive.

Feature data 126 may identify, for each of a plurality of articles, specifications for the article, performance characteristics of the article, and outputs from the article. In the case of server computing devices, as an illustrative example, feature data 124 may identify specifications that include a total mass of the devices and physical dimensions of the devices, performance characteristics that include a data processing rate and a data storage capacity of the devices, outputs that include a data transmission rate of the devices, and inputs that include power consumption and a quantity of data ports of the devices.

At 510, PQM system 112 may perform feature removal for features missing from feature data 124. At 512, PQM system 112 may perform feature removal for features identified as having a low variance. As an example, feature data 124 may include 100 rows of data, with two features F1 and F2. In this example, F1 may have 80 blank rows within the feature data, and the 80 blank rows may be removed at 510. A threshold proportion of missing values within the feature data may be used to determine whether a feature is to be removed at 510. As an example, attaining or exceeding a threshold of 15-20% of missing values for a feature within the feature data may be used to determine that the feature is to be removed at 510. As another example, feature F2 may have the same value "X" for each of the 100 rows. In this example, feature F2 may be removed at step 512, since there is no variation in the values which could prove useful for pattern recognition and prediction by the model.

Following feature removal at 510 and 512, PQM system 112 may fill missing data with default values for remaining features at 514. For features that are considered for outlier detection 412 as part of feature engineering 410, PQM system 112 may identify each feature as an ordinal feature represented by an ordinal categorical variable or a nominal feature represented by a nominal categorical value. A feature may be identified as a nominal feature where the feature refers to a respective category among a set of mutually exclusive categories. An example of a nominal feature for a solid state drive includes an interface type of the solid state drive. A feature may be identified as an ordinal feature where the feature refers to a value having a rank or order within a range of values. An ordinal feature for a solid state drive includes a height or a mass of the solid state drive, as examples.

At 518, PQM system 112 performs ordinal encoding for ordinal features identified at 516. At 520, PQM system 112 performs label encoding for the target nominal feature identified at 516. At 522, PQM system 112 performs K-fold target encoding for nominal features identified at 516. PQM system 112 implements a random forest classification (RFC) model 524 using the encodings obtained at 518, 520, and 522 to identify primary features at 526 based on the random forest. At 528, PQM system 112 prepares data for classification and/or regression at outlier detection 412 with primary features identified at 526.

Figure 6:
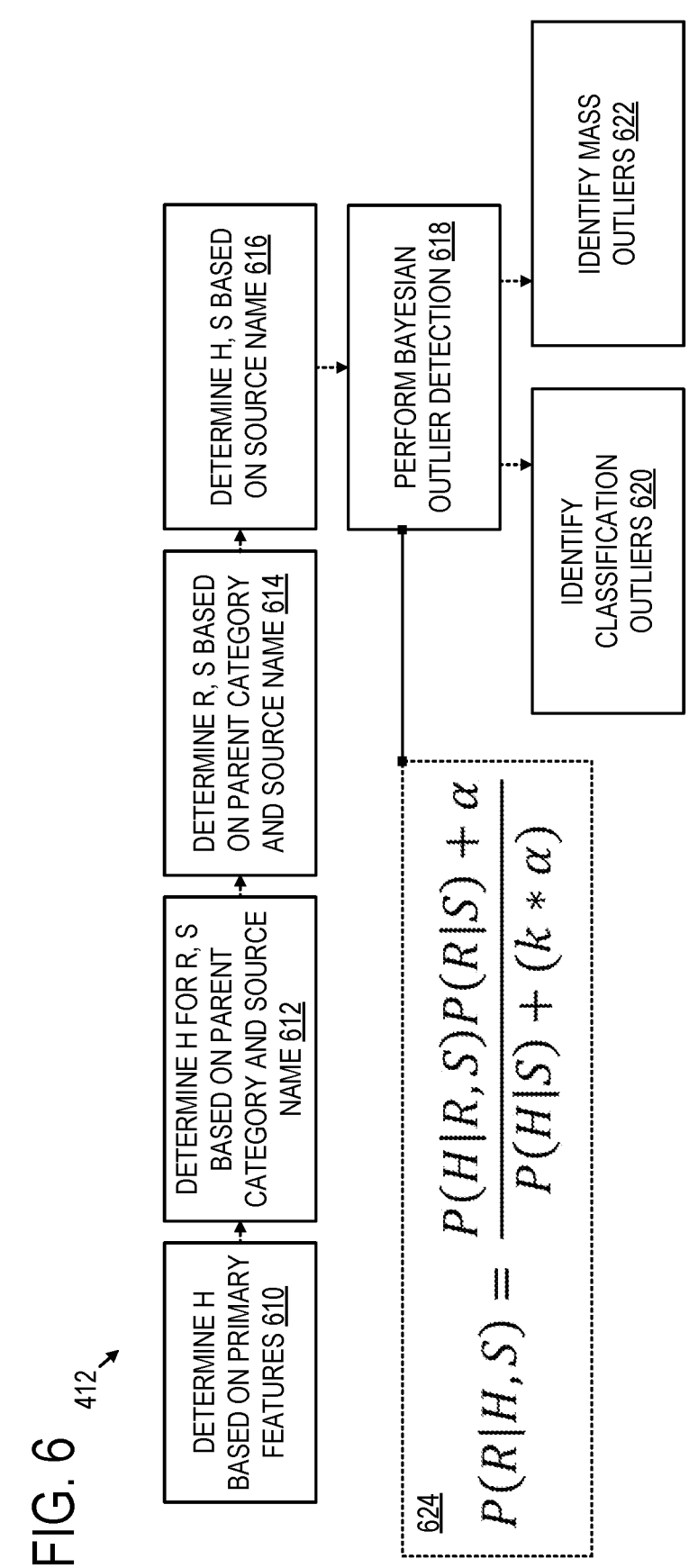
FIG. 6 schematically depicts additional aspects of outlier detection of the parts quality management system of FIG. 4.

FIG. 6 schematically depicts additional aspects of outlier detection 412 of FIG. 4. In the following discussion, the application of Bayes Theorem is described to a data set. In this discussion, H refers to a set of features (e.g., the primary features identified by feature engineering 410 of FIG. 5) that identify a part type, R refers to a category (parent category) applied to a part, and S refers to a supplier (source name) for a part. Initially, at 610, the PQM system 112 determines respective counts of unique H, R, and S values in the subject data set. At 612, PQM system 112 calculates P(H|R,S), the probability of H with respect to R and S, based on the unique counts for parent category R and source name S in the data set. At 614, the PQM system 112 calculates P(R|S), the probability of R given S in the data set, based on the unique counts for the parent category R and source name S in the data set. At 616, the PQM system 112 calculates P(H|S), the probability of H given S, based on the quantity of unique values for H and the source name S in the data set. At 618, PQM system performs Bayesian outlier detection by evaluating the formula:

$$P(R|H, S) = \frac{P(H|R, S)P(R|S) + \alpha}{P(H|S) + (k * \alpha)}$$

At 620, the PQM system identifies classification outliers, and at 622 the PQM system identifies mass outliers. These outliers are identified by applying thresholds. For example, minimum and maximum thresholds such as <10% and >90% can be adopted. Using the example thresholds of 10% and 90%, outliers are classified as those falling below 10% and above 90% in the probability distribution. It will be appreciated that these values are exemplary and other values for these thresholds may be applied.

Figure 7:
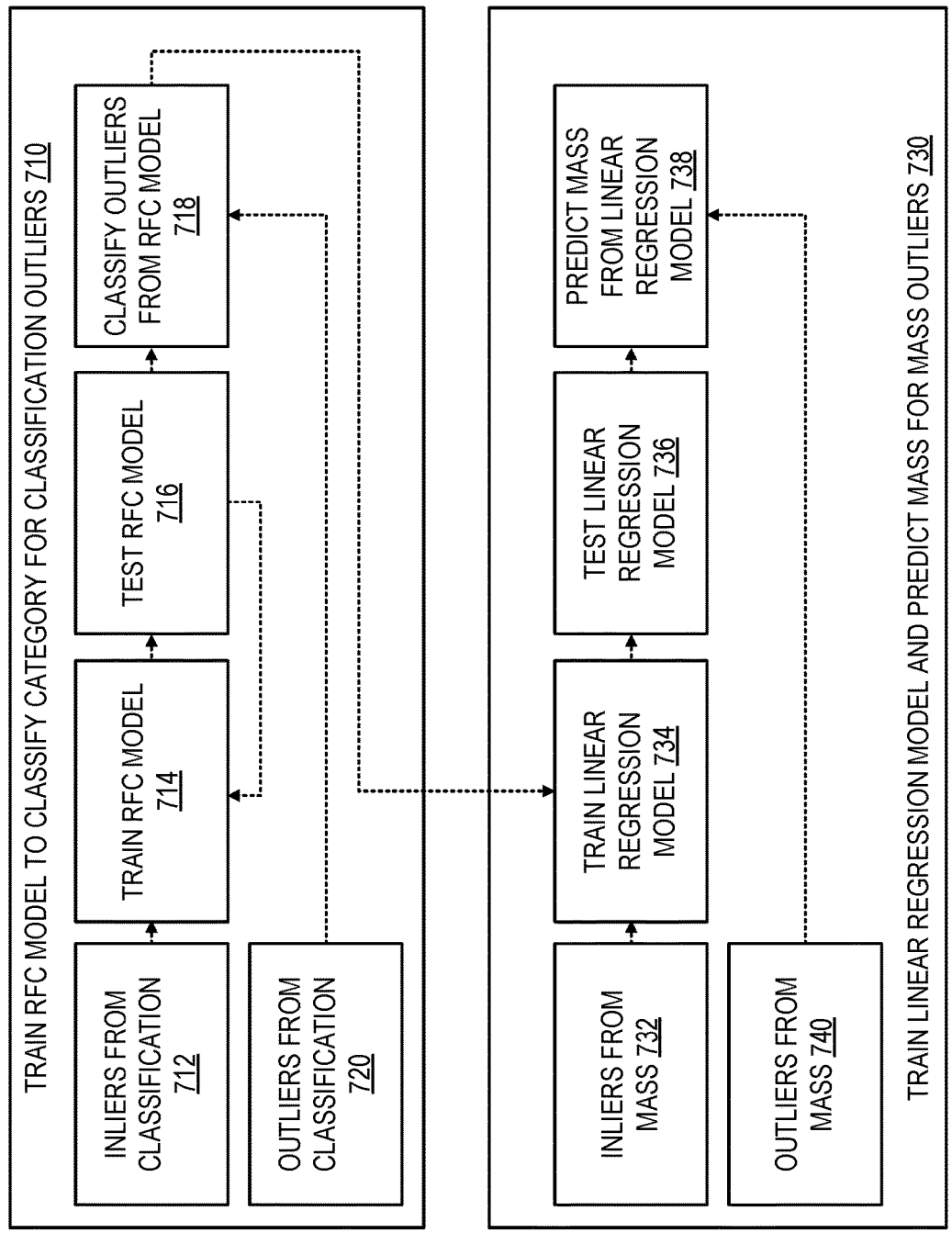
FIG. 7 schematically depicts additional aspects of proxy implementation by the parts quality management system of FIG. 4.

FIG. 7 schematically depicts additional aspects of proxy implementation 418 of FIG. 4. At 710, PQM system 112 trains an RFC model to classify a category for classification outliers. PQM system 112 uses classification inliers 712 as training data to train an RFC model at 714. The RFC model is tested at 716 to determine whether the RFC model has been sufficiently trained. Additional training may be performed at 714 based on testing performed at 716 until adequate convergence of the RFC model is achieved. At 718, classification outliers 720 are provided to the RFC model to predict a category for the outliers using the RFC model.

At 730, PQM system 112 trains a linear regression model to predict a mass for each mass outlier. The results of the classification from the RFC model at 718 are provided to the linear regression model at 734, along with classification inliers from mass 732, to thereby train the linear regression model at 734. That is, PQM system 112 uses mass classification inliers 732 and classified outliers from the RFC model obtained at 710 to train the linear regression model at 734. The linear regression model is tested at 736 to determine whether the linear regression model has been sufficiently trained. Additional training may be performed at 734 based on testing performed at 736 until adequate convergence of the linear regression model is achieved. At 738, classification outliers from the mass 740 (from 622 above) are provided to the trained linear regression model, to thereby predict mass for the outliers using the trained linear regression model.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
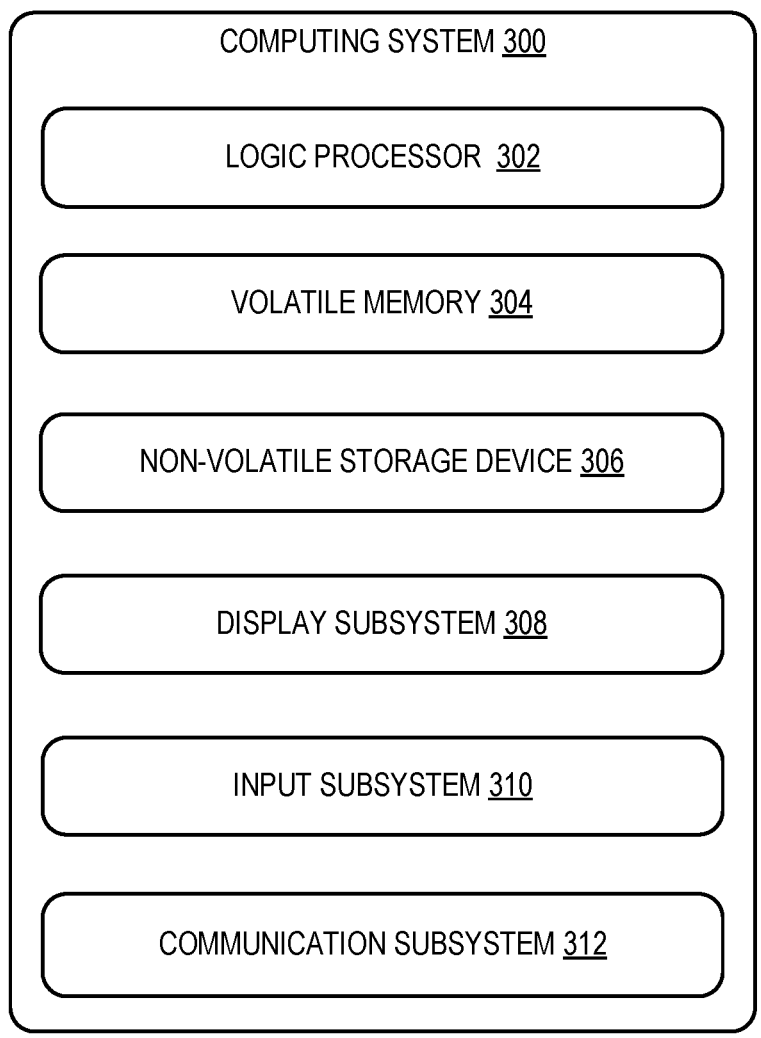
FIG. 8 is a schematic diagram depicting an example computing system that can perform the methods and implement the process flows described herein.

FIG. 8 schematically shows a non-limiting embodiment of a computing system 300 that can enact one or more of the methods and processes described above. Computing system 300 is shown in simplified form. Computing system 300 may embody the computing system 100 described above. Components of computing system 300 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 8.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, camera, or microphone.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 300 to send and/or receive messages to and/or from other devices via a network such as the Internet.

Below, several aspects of the subject application are additionally described.

According to a disclosed example, a method performed by a computing system of one or more computing devices comprises: receiving article composition data for an article of manufacture, the article composition data identifying a set of parts of the article, a stated composition of each part, and a physical quantity of the stated composition of each part; classifying the stated composition of each part of the set of parts into a normalized composition that includes a set of normalized chemicals for the part; and outputting an aggregated physical quantity of each normalized chemical for the set of parts of the article. In this example or other examples disclosed herein, the stated composition is classified into the normalized composition by implementing a first classification model that queries a reference data set based on text identifying one or more constituent chemicals and/or materials of the stated composition to obtain the set of normalized chemicals. In this example or other examples disclosed herein, the stated composition is classified into the normalized composition by implementing a second classification model that queries a reference data set using regex pattern matching of text components of the article composition data identifying a constituent chemical or a material of the stated composition to obtain the set of normalized chemicals. In this example or other examples disclosed herein, the stated composition is classified into the normalized composition by implementing a third classification model that applies natural language processing to a tokenized text component of the article composition data identifying a constituent chemical or a material of the stated composition to identify a nearest neighbor to that tokenized text component within a reference data set; wherein the set of normalized chemicals and associated physical properties are determined based on the nearest neighbor. In this example or other examples disclosed herein, the method further comprises classifying the normalized composition of each part of the set of parts into a material category within a multi-level hierarchical taxonomy based on the set of normalized chemicals of that normalized composition. In this example or other examples disclosed herein, the normalized composition of each part of the set of parts is classified into a first level material category within the multi-level hierarchical taxonomy based on a predominant constituent chemical of the set of normalized chemicals of that normalized composition. In this example or other examples disclosed herein, the method further comprises outputting an aggregated physical quantity of each material category for the set of parts of the article. In this example or other examples disclosed herein, the method further comprises: classifying each part of the set of parts into a part category within a part taxonomy based on a predominant material category of the normalized composition of that part; and outputting an aggregated physical quantity of each part category for the set of parts of the article. In this example or other examples disclosed herein, the method further comprises: performing outlier detection for the aggregated physical quantity of each normalized chemical based on ground truth data of a baseline article of manufacture identifying one or more baseline aggregated physical quantities for that normalized chemical; and outputting a result of the outlier detection for the aggregated physical quantity of each normalized chemical. In this example or other examples disclosed herein, the method further comprises: responsive to the result of the outlier detection satisfying an outlier condition for a normalized chemical, incorporating a proxy value that is based on the ground truth data for that normalized chemical into a material declaration table for the article of manufacture in place of the aggregated physical quantity. In this example or other examples disclosed herein, the method further comprises receiving a feature data set that identifies one or more features of the article of manufacture; wherein the baseline article of manufacture is selected based on the one or more features. In this example or other examples disclosed herein, the aggregated physical quantity of each normalized chemical includes a mass or a proportion of the mass of that normalized chemical present within the set of parts. In this example or other examples disclosed herein, the stated composition of a part of the set of part identifies a stated material; wherein classifying the stated composition that identifies the stated material includes identifying a normalized material based on the stated material; and wherein the method further comprises querying a reference data set based on the normalized material to obtain the normalized set of constituent chemicals and associated physical properties. In this example or other examples disclosed herein, the method further comprises selecting and outputting a recycling or disposal process identifier for one or more parts of the article based on the normalized composition of each part of the one or more parts.

According to another disclosed example, a computing system comprises: one or more computing devices including processing circuitry configured to: receive article composition data for an article of manufacture, the article composition data identifying: a set of parts of the article, a stated composition of each part, and a physical quantity of the stated composition of each part; classify the stated composition of each part of the set of parts into a normalized composition that includes a set of normalized chemicals for the part; and output an aggregated physical quantity of each normalized chemical for the set of parts of the article. In this example or other examples disclosed herein, the processing circuitry is further configured to classify the stated composition into the normalized composition by implementing a first classification model that queries a reference data set based on text identifying one or more constituent chemicals and/or materials of the stated composition to obtain the set of normalized chemicals. In this example or other examples disclosed herein, the processing circuitry is further configured to classify the stated composition into the normalized composition by implementing a second classification model that queries a reference data set using regex pattern matching of text components of the article composition data identifying a constituent chemical or a material of the stated composition to obtain the set of normalized chemicals. In this example or other examples disclosed herein, the processing circuitry is further configured to classify the stated composition into the normalized composition by implementing a third classification model that applies natural language processing to a tokenized text component of the article composition data identifying a constituent chemical or a material of the stated composition to identify a nearest neighbor to that tokenized text component within a reference data set; wherein the set of normalized chemicals and associated physical properties are determined based on the nearest neighbor. In this example or other examples disclosed herein, the processing circuitry is further configured to classify the normalized composition of each part of the set of parts into a material category within a multi-level hierarchical taxonomy based on the set of normalized chemicals of that normalized composition. In this example or other examples disclosed herein, the processing circuitry is further configured to: classify the normalized composition of each part of the set of parts into a first level material category within the multi-level hierarchical taxonomy based on a predominant constituent chemical of the set of normalized chemicals of that normalized composition; output an aggregated physical quantity of each material category for the set of parts of the article; classify each part of the set of parts into a part category within a part taxonomy based on a predominant material category of the normalized composition of that part; and output an aggregated physical quantity of each part category for the set of parts of the article.

According to another disclosed example, a method performed by a computing system of one or more computing devices comprises: receiving article composition data for an article of manufacture, the article composition data identifying a set of parts of the article, a stated composition of each part, and a physical quantity of the stated composition of each part; classifying the stated composition of each part of the set of parts into a normalized composition that includes a set of normalized chemicals for the part; and outputting an aggregated physical quantity of each normalized chemical for the set of parts of the article, wherein the stated composition is classified into the normalized composition by implementing a first classification model that queries a reference data set based on text identifying one or more constituent chemicals and/or materials of the stated composition to obtain the set of normalized chemicals, the stated composition is classified into the normalized composition by implementing a second classification model that queries a reference data set using regex pattern matching of text components of the article composition data identifying a constituent chemical or a material of the stated composition to obtain the set of normalized chemicals, and the stated composition is classified into the normalized composition by implementing a third classification model that applies natural language processing to a tokenized text component of the article composition data identifying a constituent chemical or a material of the stated composition to identify a nearest neighbor to that tokenized text component within a reference data set, the set of normalized chemicals and associated physical properties being determined based on the nearest neighbor.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system of one or more computing devices, the method comprising:
   receiving article composition data for an article of manufacture, the article composition data identifying a set of parts of the article, a stated composition of each part, and a physical quantity of the stated composition of each part;
   classifying the stated composition of each part of the set of parts into a normalized composition that includes a set of normalized chemicals for the part by implementing at least one of a first classification model, a second classification model, or a third classification model; and
   outputting an aggregated physical quantity of each normalized chemical for the set of parts of the article;
   wherein the first classification model queries a reference data set based on text identifying one or more constituent chemicals and/or materials of the stated composition to obtain the set of normalized chemicals;
   wherein the second classification model queries a reference data set using regex pattern matching of text components of the article composition data identifying a constituent chemical or a material of the stated composition to obtain the set of normalized chemicals;
   wherein the third classification model applies natural language processing to a tokenized text component of the article composition data identifying a constituent chemical or a material of the stated composition to identify a nearest neighbor to that tokenized text component within a reference data set, and the set of normalized chemicals and associated physical properties are determined based on the nearest neighbor.

2. The method of claim 1, wherein the stated composition is classified into the normalized composition by implementing the first classification model.

3. The method of claim 1, wherein the stated composition is classified into the normalized composition by implementing the second classification model.

4. The method of claim 1, wherein the stated composition is classified into the normalized composition by implementing the third classification model.

5. The method of claim 1, further comprising:
   classifying the normalized composition of each part of the set of parts into a material category within a multi-level hierarchical taxonomy based on the set of normalized chemicals of that normalized composition; and
   outputting an aggregated physical quantity of each material category for the set of parts of the article.

6. The method of claim 5, wherein the normalized composition of each part of the set of parts is classified into a first level material category within the multi-level hierarchical taxonomy based on a predominant constituent chemical of the set of normalized chemicals of that normalized composition.

7. The method of claim 5, further comprising:
classifying each part of the set of parts into a part category within a part taxonomy based on a predominant material category of the normalized composition of that part; and
outputting an aggregated physical quantity of each part category for the set of parts of the article.

8. The method of claim 1, further comprising:
selecting and outputting a recycling or disposal process identifier for one or more parts of the article based on the normalized composition of each part of the one or more parts.

9. The method of claim 1, further comprising:
performing outlier detection for the aggregated physical quantity of each normalized chemical based on ground truth data of a baseline article of manufacture identifying one or more baseline aggregated physical quantities for that normalized chemical; and
outputting a result of the outlier detection for the aggregated physical quantity of each normalized chemical.

10. The method of claim 9, further comprising:
responsive to the result of the outlier detection satisfying an outlier condition for a normalized chemical, incorporating a proxy value that is based on the ground truth data for that normalized chemical into a material declaration table for the article of manufacture in place of the aggregated physical quantity.

11. The method of claim 9, further comprising:
receiving a feature data set that identifies one or more features of the article of manufacture; and
wherein the baseline article of manufacture is selected based on the one or more features.

12. The method of claim 1, wherein the aggregated physical quantity of each normalized chemical includes a mass or a proportion of the mass of that normalized chemical present within the set of parts.

13. The method of claim 1, wherein the stated composition of a part of the set of part identifies a stated material;
wherein classifying the stated composition that identifies the stated material includes identifying a normalized material based on the stated material; and
wherein the method further comprises querying a reference data set based on the normalized material to obtain the normalized set of constituent chemicals and associated physical properties.

14. A computing system, comprising:
one or more computing devices including processing circuitry configured to:
receive article composition data for an article of manufacture, the article composition data identifying: a set of parts of the article, a stated composition of each part, and a physical quantity of the stated composition of each part;
classify the stated composition of each part of the set of parts into a normalized composition that includes a set of normalized chemicals for the part; and
output an aggregated physical quantity of each normalized chemical for the set of parts of the article; and
classify the normalized composition of each part of the set of parts into a material category within a multi-level hierarchical taxonomy based on the set of normalized chemicals of that normalized composition.

15. The computing system of claim 14, wherein the processing circuitry is further configured to classify the stated composition into the normalized composition by implementing a first classification model that queries a reference data set based on text identifying one or more constituent chemicals and/or materials of the stated composition to obtain the set of normalized chemicals.

16. The computing system of claim 14, wherein the processing circuitry is further configured to classify the stated composition into the normalized composition by implementing a second classification model that queries a reference data set using regex pattern matching of text components of the article composition data identifying a constituent chemical or a material of the stated composition to obtain the set of normalized chemicals.

17. The computing system of claim 14, wherein the processing circuitry is further configured to classify the stated composition into the normalized composition by implementing a third classification model that applies natural language processing to a tokenized text component of the article composition data identifying a constituent chemical or a material of the stated composition to identify a nearest neighbor to that tokenized text component within a reference data set;
wherein the set of normalized chemicals and associated physical properties are determined based on the nearest neighbor.

18. The computing system of claim 14, wherein the processing circuitry is further configured to;
classify the normalized composition of each part of the set of parts into a first level material category within the multi-level hierarchical taxonomy based on a predominant constituent chemical of the set of normalized chemicals of that normalized composition;
output an aggregated physical quantity of each material category for the set of parts of the article;
classify each part of the set of parts into a part category within a part taxonomy based on a predominant material category of the normalized composition of that part; and
output an aggregated physical quantity of each part category for the set of parts of the article.

19. The computing system of claim 14, wherein the processing circuitry is further configured to output an aggregated physical quantity of each material category for the set of parts of the article.

20. A method performed by a computing system of one or more computing devices, the method comprising:
receiving article composition data for an article of manufacture, the article composition data identifying a set of parts of the article, a stated composition of each part, and a physical quantity of the stated composition of each part;
classifying the stated composition of each part of the set of parts into a normalized composition that includes a set of normalized chemicals for the part; and
outputting an aggregated physical quantity of each normalized chemical for the set of parts of the article, wherein
the stated composition is classified into the normalized composition by implementing a first classification model that queries a reference data set based on text identifying one or more constituent chemicals and/or materials of the stated composition to obtain the set of normalized chemicals,
the stated composition is classified into the normalized composition by implementing a second classification model that queries a reference data set using regex pattern matching of text components of the article composition data identifying a constituent chemical or a material of the stated composition to obtain the set of normalized chemicals, and the stated composition is classified into the normalized composition by implementing a third classification model that applies natural language processing to a tokenized text component of the article composition data identifying a constituent chemical or a material of the stated composition to identify a nearest neighbor to that tokenized text component within a reference data set, the set of normalized chemicals and associated physical properties being determined based on the nearest neighbor.

* * * * *